J. L. TERREL.
CULTIVATOR ATTACHMENT.
APPLICATION FILED APR. 20, 1914.

1,114,310.

Patented Oct. 20, 1914.

2 SHEETS—SHEET 1.

Witnesses

J. L. Terrel
Inventor,
by C. A. Snow & Co.
Attorneys.

UNITED STATES PATENT OFFICE.

JACKSON L. TERREL, OF STROUD, OKLAHOMA.

CULTIVATOR ATTACHMENT.

1,114,310.  Specification of Letters Patent.  Patented Oct. 20, 1914.

Application filed April 20, 1914. Serial No. 833,298.

*To all whom it may concern:*

Be it known that I, JACKSON L. TERREL, a citizen of the United States, residing at Stroud, in the county of Lincoln and State of Oklahoma, have invented a new and useful Cultivator Attachment, of which the following is a specification.

The device forming the subject matter of this application is an attachment for a cultivator of that general type which is employed for planting and bedding purposes. By its use, a cultivator may be transformed readily into an implement which will break up the soil and convert the same into a loose condition. The attachment is in the nature of a fifth plow which may be assembled readily with a cultivator of any standard construction.

The invention aims to provide novel means for supporting an auxiliary plow and for assembling the same with a standard cultivator, means being provided whereby the row markings will be the same distance from each other.

It is within the scope of the invention to improve generally and to enhance the utility of devices of that type to which the present invention appertains.

With the above and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
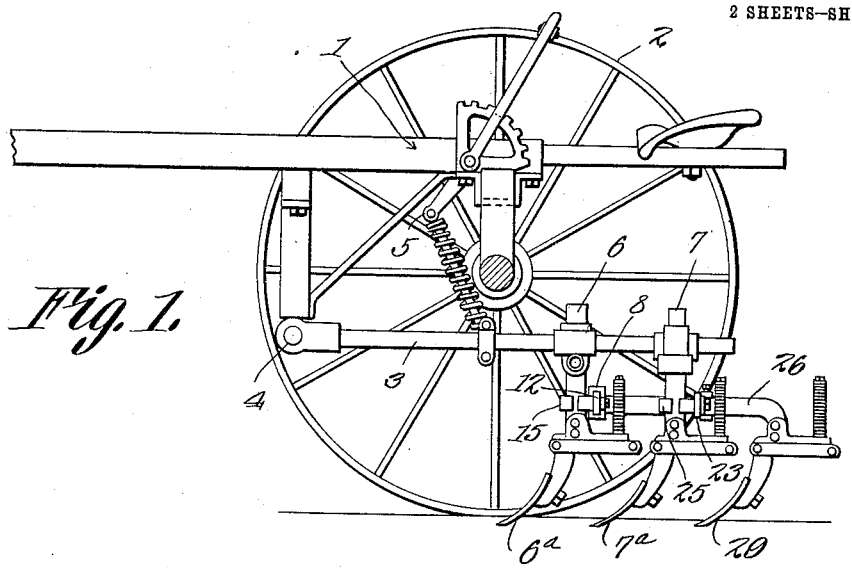
Figure 2:
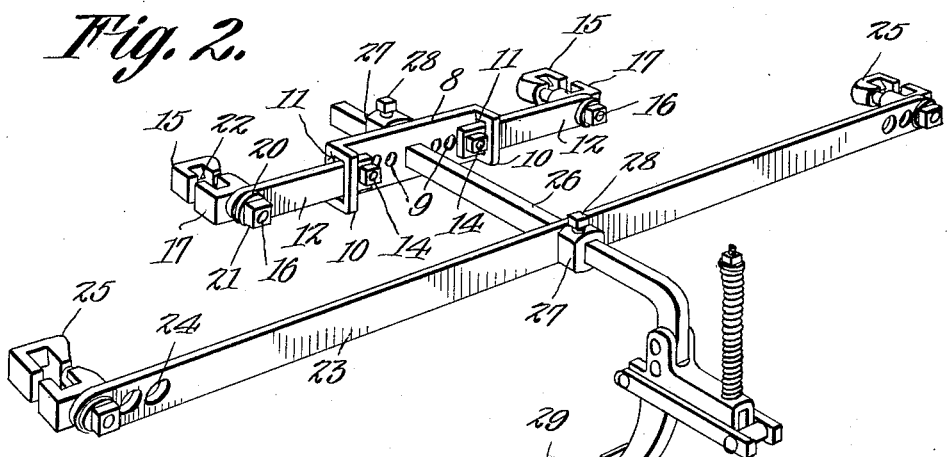
Figure 3:
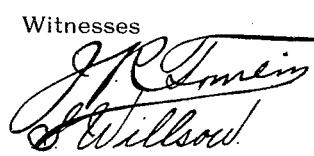
Figure 4:
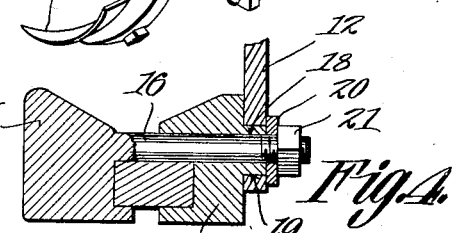
Figure 5:
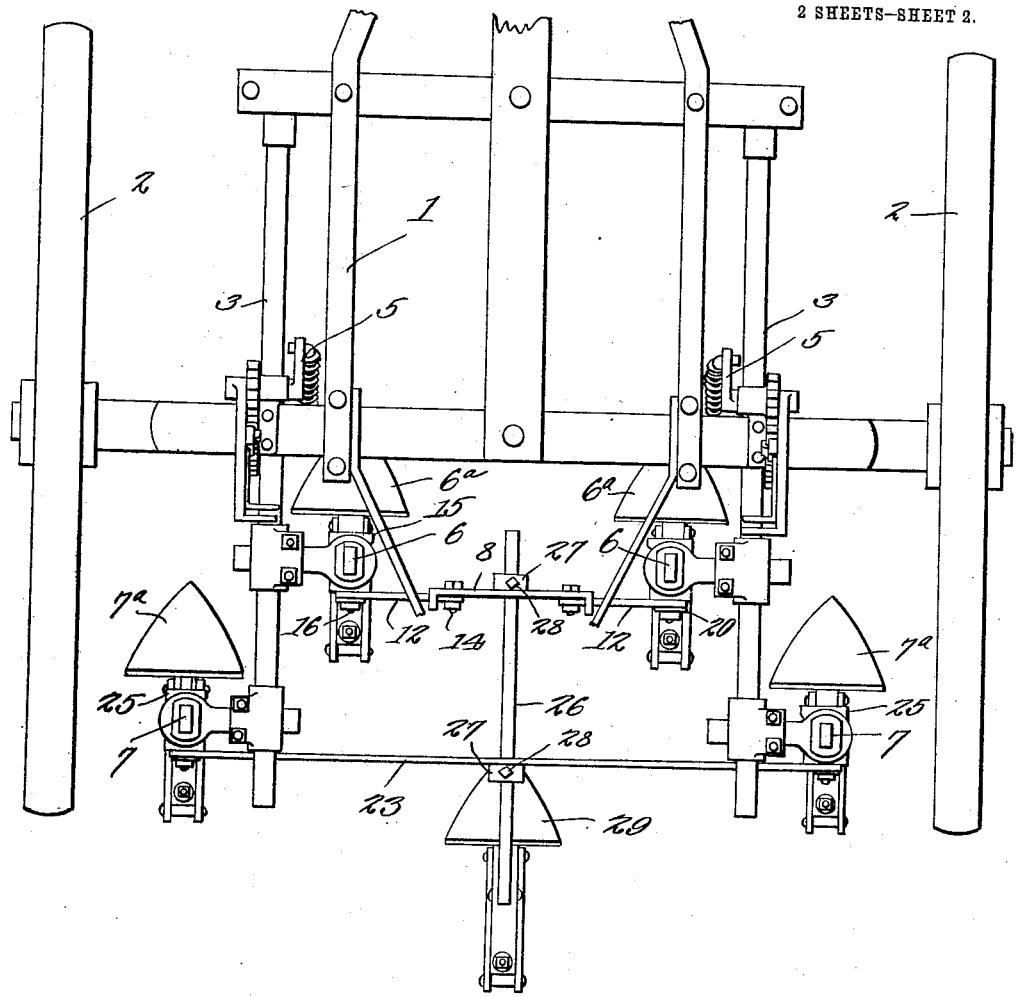

In the accompanying drawing: Figure 1 shows in vertical longitudinal section, a cultivator of standard construction, to which the present invention has been applied; Fig. 2 is a perspective view of the attachment constituting the subject matter of the present invention; Fig. 3 is a fragmental horizontal section showing certain of the connecting elements; Fig. 4 is a fragmental vertical section of the structure shown in Fig. 3. Fig. 5 is a top plan showing the invention applied to a cultivator.

By way of illustration there is shown in the accompanying drawings a cultivator which may be of any desired construction. In the present instance the cultivator is shown as comprising a frame 1 supporting ground wheels 2, the cultivator including rearwardly extended bars 3 pivotally supported as indicated at 4 for vertical movement, means 5 being provided whereby each bar 3, at the will of the operator may be raised and lowered as is common and well understood by those skilled in the art. The bars 3 carry inner, forward standards 6 and outer, rear standards 7, supporting respectively plows 6ª and 7ª. The standards 6 and 7 are connected with bars 3 for horizontal adjustment with respect to each other, thereby to regulate the distance between the rows.

The foregoing constitutes no part of the present invention and is a description of a conventional and well known cultivator construction.

Passing to a description of the attachment constituting the subject matter of the present invention and referring particularly to Fig. 2 there is shown a yoke 8 having rearwardly extended arms 10, there being a plurality of openings 9 formed in the body portion of the yoke 8 and the arms 10 having openings 11. Links 12 lie loosely in the openings 11 and pivot bolts 14 pass through the inner ends of the links 12 and are mounted in certain of the openings 9.

At the outer ends of the links 12 are located duplicate holding structures, but one of which need be described in detail. Each holding structure comprises a forward clamp 15 including a rearwardly extended stem 16. A rear clamp 17 is shown, the same having a boss lying in an opening 19 formed in the outer end of the link 12. The stem 16 of the forward clamp passes through the rear clamp and through the boss 18. The rear end of the stem 16 is surrounded by a washer 20 engaged by a nut 21. The clamps 15 and 17 as shown in Fig. 4 are provided with gripping knife edges 22 adapted to engage the forward and rear edges of the inner, forward standards 6 of the cultivator. Owing to the presence of the bosses 18, the washers 20 do not bind against the rear faces of links 12 under the action of the nuts 21 and consequently, the links 12 are free to swing in a vertical direction upon the rear portions of the stems 16. The openings 11 may be made as large as desired, but even if the openings 11 be of comparatively small size, the outer ends of the links 12 will have a considerable movement, owing to the fact that the pivot bolts 14 lie relatively close to the rearwardly extended arms 10. By the construction above described, the yoke 8 and the links 12 are connected with the inner, forward standards 6.

The invention includes a cross arm 23 in the form of a bar, provided adjacent its ends with openings 24. With any of these openings 24 may be assembled clamps 25. The construction of the clamps 25 is the same as the clamps 15—17 shown in Fig. 3, and an extended description is unnecessary. The clamps 25 are adapted to engage the outer, rear standards 7 and thus the cross arm 23 is upheld.

The invention includes a support 26 in the form of a bar, passing through the cross arm 23 and through the intermediate portion of the yoke 8. Collars 27 surround the support 26 and are located adjacent the forward face of the yoke 8 and the rear face of the cross arm 23, the collars being held in place by set screws 28. Secured to the rear end of the support 26 is a fifth plow 29 which may be of any desired construction.

Recalling that the outer rear plows 7ᵃ are adapted to be moved toward each other, it will be observed that the openings 24 in the cross arm 24 permit such an operation, it being possible to move the inner forward plows 6ᵃ toward each other, owing to the presence of the openings 9, in any of which openings, the bolts 14 may be mounted. Thus, by way of example, the structure may be adapted for use where rows are spaced three feet apart, three feet three inches apart, or three and one-half feet apart. The openings 24 permit the outer rear plows 7ᵃ to be moved inwardly with respect to the inner, forward plows 6ᵃ, and the openings 9 permit the inner, forward plows 6ᵃ to be moved toward each other with respect to the fifth plow 29. The rows formed by the implement, therefore, may be spaced at equal distances apart.

As is understood readily, the bars 3 may be raised and lowered separately by the respective raising means 5. Noting Fig. 2, let it be supposed that the right hand side of the structure is to be raised. The center of swinging movement of the bar 23 is the left hand clamp 25 and the center of swinging movement of the structure composed of the yoke 8 and the links 9 is the left hand clamp 15—17. Now the centers of swinging movement represented upon the one hand by the element 25 and upon the other hand by the left hand clamp construction 15—17 are not coincident and in order to render a raising of the right hand side of the structure possible, sufficient flexibility is afforded by the pivot bolts 14.

Having thus described the invention, what is claimed is:—

1. In a device of the class described, a yoke; links pivoted to the yoke; clamping means carried by the ends of the links; a cross arm, clamping means located at the ends of the cross arm; a support mounted in the yoke and in the cross arm; and a plow carried by the rear end of the support.

2. In a device of the class described, a yoke; links located at the ends of the yoke, the links being connected to the yoke by means of a pin and multi-hole connection; clamping means carried at the ends of the links; a cross arm; clamps, the clamps being connected with the ends of the cross arm by means of a pin and multi-hole connection; a support mounted in the yoke and in the cross arm; and a plow carried by the support.

3. In a device of the class described, a yoke including angularly disposed arms having openings; links lying in the openings; pivot elements connecting the links with the body portion of the yoke; standard engaging means carried at the ends of the links; a cross arm; standard engaging means adjustably mounted upon the ends of the cross arm for movement toward and away from the ends of the cross arm; a support extended through the yoke and the cross arm; movable abutments on the support and coöperating, respectively, with the forward and rear face of the yoke and the cross arm; and a plow mounted on the rear end of the support.

In testimony that I claim the foregoing as my own, I have hereto affixed my signature in the presence of two witnesses.

JACKSON L. TERREL.

Witnesses:
  J. D. BEHRNES,
  I. H. HARDESTY.

Copies of this patent may be obtained for five cents each, by addressing the "Commissioner of Patents, Washington, D. C."